US009954431B2

United States Patent
Zhang

(10) Patent No.: US 9,954,431 B2
(45) Date of Patent: Apr. 24, 2018

(54) STARTING CIRCUIT OF POWER MANAGEMENT CHIP, AND POWER MANAGEMENT CHIP

(71) Applicant: CSMC TECHNOLOGIES FAB1 CO., LTD., Jiangsu (CN)

(72) Inventor: Nan Zhang, Jiangsu (CN)

(73) Assignee: CSMC TECHNOLOGIES FAB1 CO., LTD., Jiangsu (CN)

( * ) Notice: Subject to any disclaimer, the term of this patent is extended or adjusted under 35 U.S.C. 154(b) by 155 days.

(21) Appl. No.: 14/901,482

(22) PCT Filed: May 30, 2014

(86) PCT No.: PCT/CN2014/078912
§ 371 (c)(1),
(2) Date: Dec. 28, 2015

(87) PCT Pub. No.: WO2014/206178
PCT Pub. Date: Dec. 31, 2014

(65) Prior Publication Data
US 2016/0373004 A1 Dec. 22, 2016

(30) Foreign Application Priority Data

Jun. 25, 2013 (CN) .......................... 2013 1 0260511

(51) Int. Cl.
*H02M 1/36* (2007.01)
*H02M 1/00* (2006.01)
(52) U.S. Cl.
CPC ...... *H02M 1/36* (2013.01); *H02M 2001/0006* (2013.01)
(58) Field of Classification Search
CPC .................... H02M 1/36; H02M 2001/0006
See application file for complete search history.

(56) References Cited

U.S. PATENT DOCUMENTS

| 4,564,767 A | 1/1986 | Charych |
| 7,030,686 B2* | 4/2006 | Itoh .......................... G05F 1/575 323/316 |
| 7,167,028 B2* | 1/2007 | Hachiya ............ H02M 3/33523 327/103 |

FOREIGN PATENT DOCUMENTS

| CN | 1106594 A | 8/1995 |
| CN | 1196604 A | 10/1998 |

(Continued)

OTHER PUBLICATIONS

Office Action dated Oct. 17, 2016 issued in corresponding Chinese Application No. 201310260511.2, pp. 1-10.
International Search Report, PCT/CN2014/078912.

*Primary Examiner* — Hai L Nguyen
(74) *Attorney, Agent, or Firm* — Polsinelli PC

(57) ABSTRACT

A starting circuit (10) of a power management chip, comprising: a starting capacitor (C3) which is used for connecting a power supply via an external resistor (R2) to perform charging; a switch circuit (100) which is connected between the external resistor (R2) and the starting capacitor (C3); a voltage detection circuit (200) which is used for detecting a voltage on the starting capacitor (C3) and is connected to the switch circuit (100) so as to control the on/off switching of the switch circuit (100); and a voltage maintaining circuit (300) which is connected between the starting capacitor (C3) and an operating circuit of the power management chip and is used for acquiring a voltage that maintains the starting capacitor (C3) from the operating circuit of the power management chip, wherein when the voltage detection circuit (200) detects that the starting capacitor (C3) reaches the starting voltage of the power management chip, the broken circuit of the switch circuit (100) is controlled. Further provided is a power management chip including the above-mentioned starting circuit (10). Disconnecting an external (Continued)

power source from the starting capacitor after the operating circuit of the power management chip is started can reduce the electric energy consumption.

8 Claims, 2 Drawing Sheets

(56) References Cited

FOREIGN PATENT DOCUMENTS

| CN | 1196605 A | 10/1998 |
|---|---|---|
| CN | 1209680 A | 3/1999 |
| CN | 1344056 A | 4/2002 |
| CN | 1489270 A | 4/2004 |
| CN | 1909354 A | 2/2007 |
| CN | 201213252 Y | 3/2009 |
| CN | 102097928 A | 6/2011 |
| CN | 103078486 A | 5/2013 |

* cited by examiner

STARTING CIRCUIT OF POWER MANAGEMENT CHIP, AND POWER MANAGEMENT CHIP

CROSS REFERENCE TO RELATED APPLICATIONS

This application is a national stage application (under 35 U.S.C. § 371) of PCT/CN2014/078912, filed May 30, 2014, which claims priority to Chinese Application No. 201310260511.2, filed Jun. 25, 2013, the contents of which are incorporated herein by reference in its entirety.

FIELD OF THE INVENTION

The present invention relates to power supply management chips, and more particularly relates to a starting circuit of a power supply management chip and a power supply management chip.

BACKGROUND OF THE INVENTION

The power supply management class chips are the chips managing electricity consumption of various modules in a system. It usually employs the external resistor to enable starting of the chips and reducing of voltage by obtaining electricity from a high voltage. FIG. 1 is a schematic diagram of a starting circuit of a traditional power supply management class chip. As shown in FIG. 1, after the alternating current is rectified via a rectifier 1 and filtered via a filter capacitor C1, it is connected to a power supply management chip 2 through a starting resistor R1. The power supply management chip 2 obtains electricity through the starting resistor R1 for charging the starting capacitor C1. When the voltage of the starting capacitor C1 reaches a starting voltage, the power supply management chip 2 begins to work.

The problem present in the circuit described above is that after the power supply management chip 2 begins to work, the starting resistor R1 continues to consume electrical energy.

SUMMARY OF THE INVENTION

On the basis of this, it is necessary to provide a starting circuit of a power supply management chip which can cut off power supply for the external resistor after the power supply management chip begins to work, reducing consumption of electrical energy.

Moreover, a power supply management chip is also provided.

A starting circuit of a power supply management chip, comprising: a starting capacitor configured to be connected to a power supply through an external resistor to be charged; a switching circuit configured to be connected between the external resistor and the starting capacitor; a voltage detecting circuit to detect a voltage on the starting capacitor, and configured to be connected to the switching circuit to control on/off of the switching circuit; a voltage maintaining circuit configured to be connected between the starting capacitor and a work circuit of the power supply management chip to obtain a voltage for maintaining the starting capacitor from the work circuit of the power supply management chip; wherein, when detecting the starting capacitor reaches a starting voltage of the power supply management chip, the voltage detecting circuit controls the switching circuit to turn off.

In one of embodiments, the switching circuit comprises a N type junction field effect transistor Q1, NMOS transistors Q2 and Q3 and a PMOS transistor Q4; a drain of the N type junction field effect transistor Q1 is connected to a external power supply, a gate thereof is connected to a reference ground; a source of the N type junction field effect transistor Q1 is connected to a drain of the NMOS transistor Q2 and a gate of the NMOS transistor Q3 through a first resistance network, to a drain of the NMOS transistor Q3 and a gate of the PMOS transistor Q4 through a second resistance network, and to a source of the PMOS transistor Q4 through a diode D1; wherein the source of the N type junction field effect transistor Q1 is connected to an anode of the diode D1; a gate of the NMOS transistor Q2 is connected to the voltage detecting circuit for receiving high/low level signals output from the voltage detecting circuit, sources of the NMOS transistors Q2 and Q3 and a substrate are all connected to the reference ground; the source of the PMOS transistor Q4 and the substrate are all connected to a cathode of the diode D1, a drain thereof is connected to the starting capacitor.

In one of embodiments, the voltage maintaining circuit comprises a secondary inductance coil L1 and a diode D2 connected in series, wherein the secondary inductance coil L1 is coupled to a primary inductance coil of the work circuit in the power supply management chip to obtain electrical energy from the work circuit to maintain a voltage of the starting capacitor C3; an anode of the diode D2 is connected to the secondary inductance coil L1, the cathode thereof is connected to the starting capacitor.

A power supply management chip comprises the starting circuit described above.

A starting circuit of a power supply management chip, comprising: a starting capacitor configured to be connected to a power supply through an external resistor to be charged; a switching circuit configured to be connected between the external resistor and the starting capacitor; a voltage maintaining circuit configured to be connected between the starting capacitor and a work circuit of the power supply management chip to obtain a voltage for maintaining the starting capacitor from the work circuit of the power supply management chip; wherein, when detecting the starting capacitor reaches a starting voltage of the power supply management chip, the power supply management chip controls the switching circuit to turn off.

In one of embodiments, the switching circuit comprises a N type junction field effect transistor Q1, NMOS transistors Q2 and Q3 and a PMOS transistor Q4; a drain of the N type junction field effect transistor Q1 is connected to a external power supply, a gate thereof is connected to a reference ground; a source of the N type junction field effect transistor Q1 is connected to a drain of the NMOS transistor Q2 and a gate of the NMOS transistor Q3 through a first resistance network, to a drain of the NMOS transistor Q3 and a gate of the PMOS transistor Q4 through a second resistance network, and to a source of the PMOS transistor Q4 through a diode D1; wherein the source of the N type junction field effect transistor Q1 is connected to an anode of the diode D1; a gate of the NMOS transistor Q2 is configured to be connected to the voltage detecting circuit in the power supply management chip which detects a voltage on the starting capacitor, and to receive high/low level signals output from the voltage detecting circuit, sources of the NMOS transistors Q2 and Q3 and a substrate are all connected to the reference ground; the source of the PMOS transistor Q4 and the substrate are all connected to a cathode of the diode D1, a drain thereof is connected to the starting capacitor.

In one of embodiments, the voltage maintaining circuit comprises a secondary inductance coil L1 and a diode D2 connected in series, wherein the secondary inductance coil L1 is coupled to a primary inductance coil of the work circuit in the power supply management chip to obtain electrical energy from the work circuit to maintain a voltage of the starting capacitor C3; an anode of the diode D2 is connected to the secondary inductance coil L1, the cathode thereof is connected to the starting capacitor.

A power supply management chip comprises a voltage detecting circuit and the starting circuit described previously, the voltage detecting circuit is configured to detect whether the voltage of the starting capacitor reaches a starting voltage of the power supply management chip.

After starting the work circuit of the power supply management chip, the starting circuit and the power supply management chip described above disconnect the connection of the external power supply with the starting capacitor, reducing consumption of electrical energy. Meanwhile, the structure of the circuit is also very simple, and does not increase the area of the power supply management chip.

DETAILED DESCRIPTION OF THE EMBODIMENTS

Figure 1:
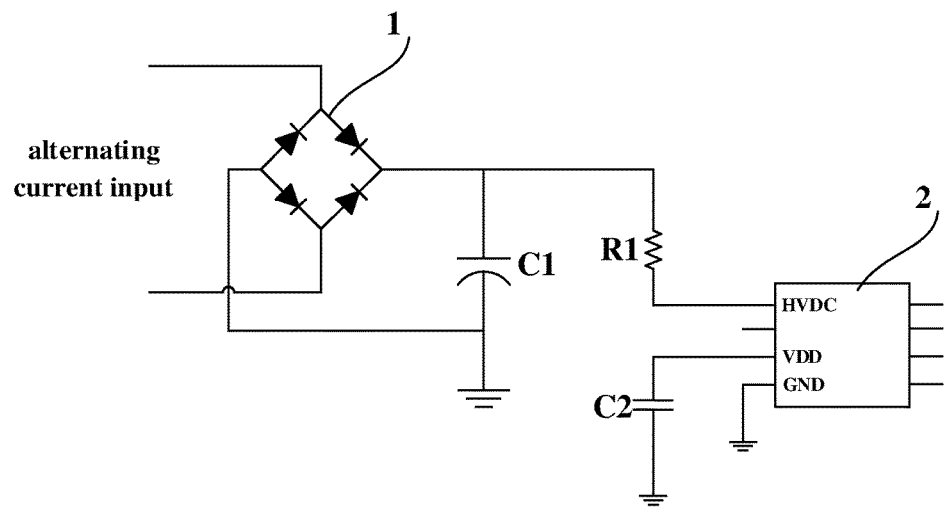
FIG. 1 is a schematic diagram of the starting circuit of the traditional power supply management chip.
Figure 2:
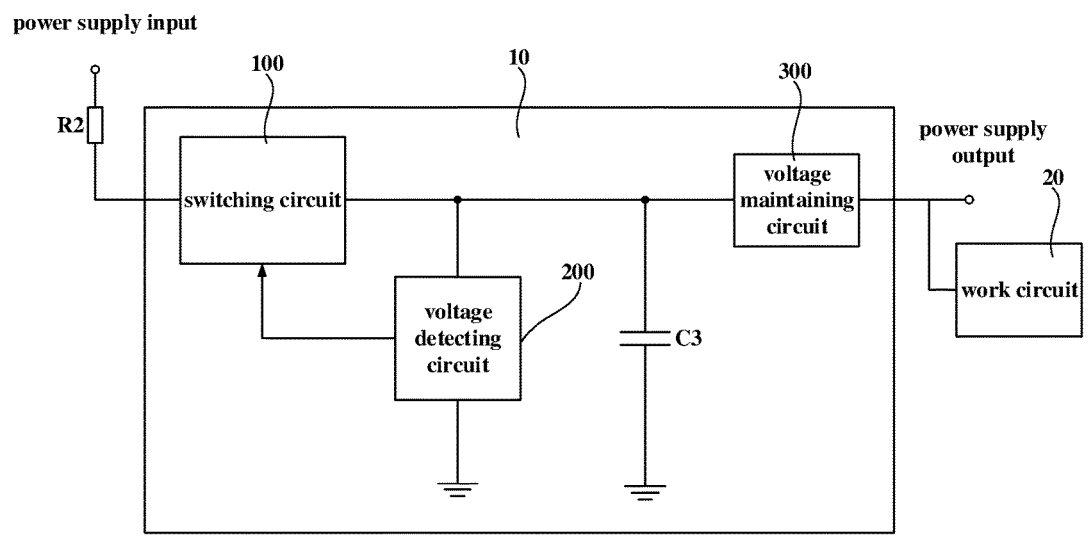
FIG. 2 is a modular diagram of the starting circuit of the power supply management chip of an embodiment.

As shown in FIG. 2, it is a modular diagram of a starting circuit of a power supply management chip of an embodiment. The starting circuit 10 comprises a switching circuit 100, a voltage detecting circuit 200, a starting capacitor C3 and a voltage maintaining circuit 300. The switching circuit 100 is connected between a external resistor R2 and the starting capacitor C3. The voltage detecting circuit 200 is configured to detect a voltage of the starting capacitor C3, and connected to the switching circuit 100 for controlling on/off of the switching circuit 100. In particular, when the voltage detecting circuit 200 detects that the voltage of the starting capacitor C3 reaches a starting voltage of the power supply management chip, it controls the switching circuit 100 to turn off. The voltage maintaining circuit 300 is connected between the starting capacitor C3 and a work circuit 20 of the power supply management chip to obtain a voltage for maintaining the starting capacitor C3 from the work circuit 20 of the power supply management chip. Wherein the voltage detecting circuit 200 can also belong to the starting circuit rather than be a part of the power supply management chip.

On the basis of the circuits described above, when the voltage of the starting capacitor C3 reaches a starting voltage of the power supply management chip, this is detected by the voltage detecting circuit 200, and the voltage detecting circuit 200 controls the switching circuit to turn off. Further, the external power supply will not charge the starting capacitor C3 by the external resistor R2, and the external resistor R2 no long consumes electrical energy. Meanwhile, because the work circuit 20 of the power supply management chip begins to work, power will be supplied by a power supply. The voltage maintaining circuit 300 obtains a voltage for maintaining the starting capacitor C3 from the work circuit 20, ensuring normal work of the work circuit 20.

Figure 3:
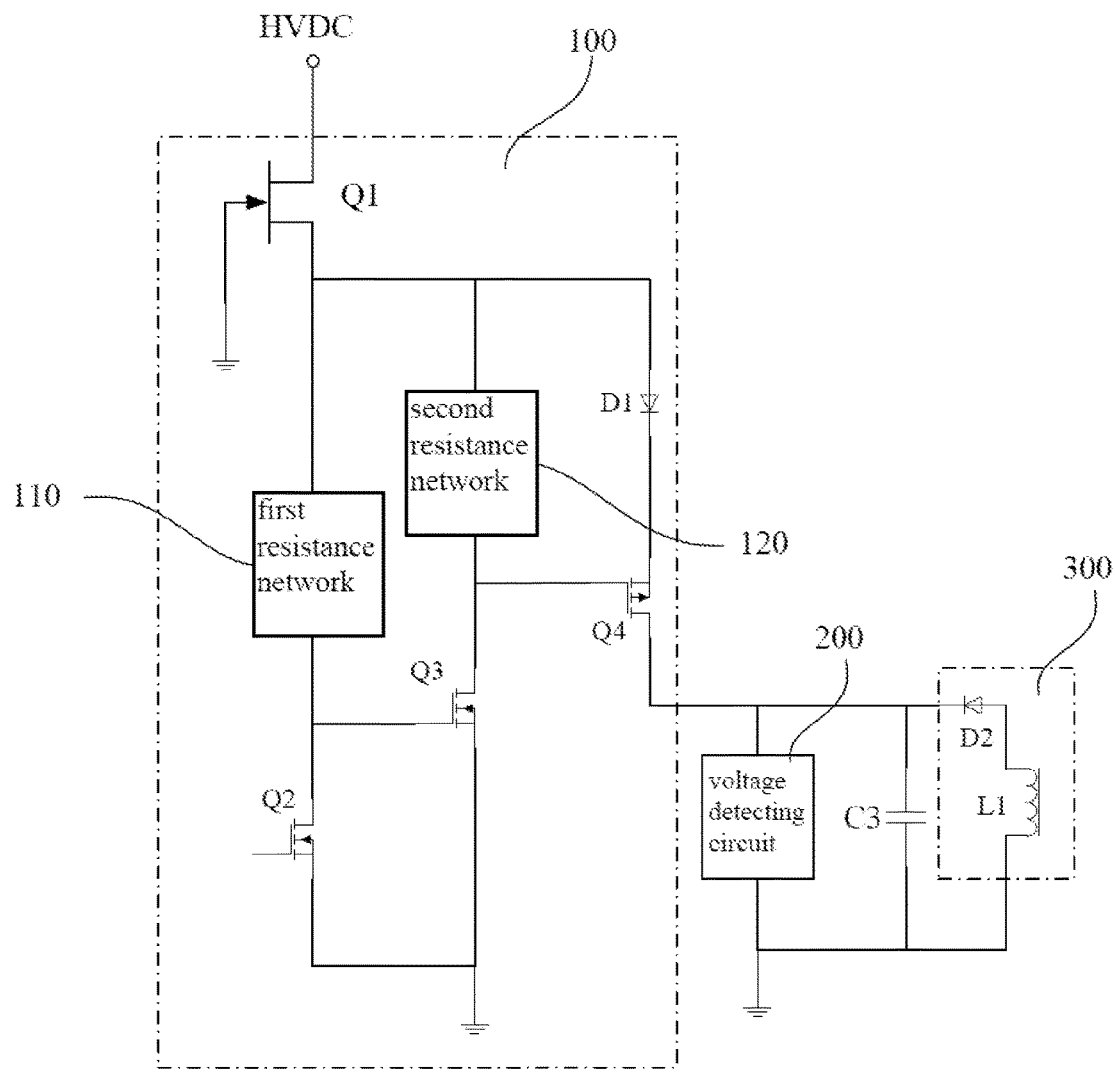
FIG. 3 is a schematic diagram of the starting circuit of the power supply management chip of an embodiment shown in FIG. 2.

As shown in FIG. 3, it is a schematic diagram of the starting circuit of the embodiment shown in FIG. 2.

The switching circuit 100 comprises a N type junction field effect transistor (N-JFET) Q1, NMOS transistors Q2 and Q3 and a PMOS transistor Q4. A drain of the N type junction field effect transistor Q1 is connected to the external power supply, a gate thereof is connected to a reference ground. A source of the N type junction field effect transistor Q1 is connected to a drain of the NMOS transistor Q2 and a gate of the NMOS transistor Q3 through a first resistance network 110, to a drain of the NMOS transistor Q3 and a gate of the PMOS transistor Q4 through a second resistance network 120, and to a source of the PMOS transistor Q4 through a diode D1; wherein the source of the N type junction field effect transistor Q1 is connected to an anode of the diode D1.

The first resistance network 110 and the second resistance network 120 can enable a required resistance value by the series/parallel of fixed resistors or a rheostat.

A gate of the NMOS transistor Q2 is connected to the voltage detecting circuit 200 for receiving high/low level signals output from the voltage detecting circuit 200, sources of the NMOS transistors Q2 and Q3 and a substrate are all connected to the reference ground.

The source of the PMOS transistor Q4 and the substrate are all connected to a cathode of the diode D1, a drain thereof is connected to the starting capacitor. When a voltage at the source end of the N type junction field effect transistor Q1 is lower than a voltage of the starting capacitor C3, the diode D1 can prevent the PMOS transistor Q4 from occurring the phenomenon of body diode forward bias conduction, for preventing the voltage of the starting capacitor C3 from reducing too fast.

The voltage maintaining circuit 300 comprises a secondary inductance coil L1 and a diode D2 connected in series, wherein the secondary inductance coil L1 is coupled to a primary inductance coil (not shown in FIGS.) of the work circuit in the power supply management chip to obtain electrical energy from the work circuit to maintain a voltage of the starting capacitor C3. An anode of the diode D2 is connected to the secondary inductance coil L1, the cathode thereof is connected to the starting capacitor C3, for preventing the starting capacitor C3 from discharging an inductor.

The voltage detecting circuit 200 is a regular circuit in the field, and can enable to detect voltage and output high/low level signals with a chip, and then this is not discussed here.

On the basis of the circuits described above, the working principle will be described briefly as follows.

The gate of the NMOS transistor Q2 is initiated to be a low level, and the voltage on the starting capacitor C3 is 0. When the drain of the N type junction field effect transistor Q1 begins to be powered up, because the gate of the NMOS transistor Q2 is in a low level, the NMOS transistor Q2 is in an off state, and the NMOS transistor Q3 is in an on state; the gate of the PMOS transistor Q4 is in a low level, and then the PMOS transistor Q4 is turned on. The current flowing through the N type junction field effect transistor Q1, the diode D1 and the PMOS transistor Q4 charges the starting capacitor C3, on which the voltage is increased gradually.

As the voltage of the starting capacitor C3 increases up to the starting voltage, the voltage detecting circuit 200 will output a signal, for providing the gate of the NMOS transistor Q2 with a high level, so that the NMOS transistor Q2 is turned on, making it output a low level, for turning the NOMS transistor Q3 off, and then the NOMS transistor Q3 outputs a high level, for turning the PMOS transistor Q4 off, and for ending the charging state of the starting capacitor C3, and then the voltage of the starting capacitor C3 will stop to increase, and the starting circuit will be turned off, reducing power consumption of the starting circuit. Meanwhile, the starting process is completed, the system begins to work, and the voltage on the starting capacitor C3 begins to decrease.

When the system circuit begins to work, the starting capacitor C3 is provided with energy by the secondary inductance coil L1.

It can be understood that the N type junction field effect transistor Q1, the NMOS transistors Q2 and Q3 and the PMOS transistor Q4 described above can be replaced with other high voltage transistors, such as a high voltage depletion transistor, LDMOS and so on.

It can be understood that the starting circuit is integrated in the power supply management chip, and then after starting the power supply management chip can cut off charging of the starting capacitor by the external power supply, reducing consumption of electrical energy.

After the work circuit of the power supply management chip is started, the circuits described above can cut off the connection of the external power supply and the starting capacitor, reducing consumption of electrical energy. Meanwhile, the structure of the circuits is very simple, and does not increase the area of the power supply management chip.

The above embodiments only express several embodied manners, the description of which is more specific and detailed. However, it cannot be understood as limitation of the scope of the present invention. It should be indicated that for those skilled in the art, a variety of modifications and changes may be made without departing from the idea of the present invention. Therefore, the scope of the present invention is intended to be defined by the appended claims.

What is claimed is:

1. A starting circuit of a power supply management chip, comprising:
   a starting capacitor connected to a power supply through an external resistor to be charged;
   a switching circuit connected between the external resistor and the starting capacitor;
   a voltage detecting circuit to detect a voltage on the starting capacitor, connected to the switching circuit to control on/off of the switching circuit;
   a power supply circuit connected between the starting capacitor and a work circuit of the power supply management chip to maintain voltage of the starting capacitor;
   wherein when detecting a voltage of the starting capacitor reaches a starting voltage of the power supply management chip, the voltage detecting circuit controls the switching circuit to turn off.

2. The starting circuit of the power supply management chip of claim 1, wherein the switching circuit comprises a N type junction field-effect transistor Q1, NMOS transistors Q2 and Q3 and a PMOS transistor Q4;
   a drain of the N type junction field effect transistor Q1 is connected to an external power supply, a gate thereof is connected to a reference ground; a source of the N type junction field effect transistor Q1 is connected to a drain of the NMOS transistor Q2 and a gate of the NMOS transistor Q3 through a first resistance network, to a drain of the NMOS transistor Q3 and a gate of the PMOS transistor Q4 through a second resistance network, and to a source of the PMOS transistor Q4 through a diode D1; wherein the source of the N type junction field effect transistor Q1 is connected to an anode of the diode D1;
   a gate of the NMOS transistor Q2 is connected to the voltage detecting circuit for receiving high/low level signals output from the voltage detecting circuit, sources of the NMOS transistors Q2 and Q3 and a substrate are connected to the reference ground;
   the source of the PMOS transistor Q4 and the substrate are connected to a cathode of the diode D1, a drain thereof is connected to the starting capacitor.

3. The starting circuit of the power supply management chip of claim 1, wherein the power supply circuit comprises a secondary inductance coil L1 and a diode D2 connected in series, wherein the secondary inductance coil L1 is coupled to a primary inductance coil of the work circuit in the power supply management chip to obtain electrical energy from the work circuit to maintain the voltage of the starting capacitor C3; an anode of the diode D2 is connected to the secondary inductance coil L1, the cathode thereof is connected to the starting capacitor.

4. A power supply management chip, comprising the starting circuit of claim 1.

5. A starting circuit of a power supply management chip, comprising:
   a starting capacitor connected to a power supply through an external resistor to be charged;
   a switching circuit connected between the external resistor and the starting capacitor;
   a power supply circuit connected between the starting capacitor and a work circuit of the power supply management chip to obtain a voltage to maintain voltage of the starting capacitor from the work circuit of the power supply management chip;
   wherein, when detecting a voltage of the starting capacitor reaches a starting voltage of the power supply management chip, the power supply management chip controls the switching circuit to turn off.

6. The starting circuit of the power supply management chip of claim 5, wherein the switching circuit comprises a N type junction field effect transistor Q1, NMOS transistors Q2 and Q3 and a PMOS transistor Q4;
   a drain of the N type junction field effect transistor Q1 is connected to an external power supply, a gate thereof is connected to a reference ground; a source of the N type junction field effect transistor Q1 is connected to a drain of the NMOS transistor Q2 and a gate of the NMOS transistor Q3 through a first resistance network, to a drain of the NMOS transistor Q3 and a gate of the PMOS transistor Q4 through a second resistance network, and to a source of the PMOS transistor Q4 through a diode D1; wherein the source of the N type junction field effect transistor Q1 is connected to an anode of the diode D1;
   a gate of the NMOS transistor Q2 is configured to be connected to the voltage detecting circuit in the power supply management chip which detects a voltage on the starting capacitor, and to receive high/low level signals output from the voltage detecting circuit, sources of the NMOS transistors Q2 and Q3 and a substrate are all connected to the reference ground;
   the source of the PMOS transistor Q4 and the substrate are all connected to a cathode of the diode D1, a drain thereof is connected to the starting capacitor.

7. The starting circuit of the power supply management chip of claim 5, wherein the power supply circuit comprises a secondary inductance coil L1 and a diode D2 connected in series, wherein the secondary inductance coil L1 is coupled to a primary inductance coil of the work circuit in the power supply management chip to obtain electrical energy from the work circuit to maintain a voltage of the starting capacitor C3; an anode of the diode D2 is connected to the secondary inductance coil L1, the cathode thereof is connected to the starting capacitor.

8. A power supply management chip, comprising:
- a starting capacitor connected to a power supply through an external resistor to be charged;
- a switching circuit connected between the external resistor and the starting capacitor;
- a voltage detector configured to detect whether a voltage of the starting capacitor reaches a starting voltage of the power supply management chip;
- a power supply circuit connected between the starting capacitor and a work circuit of the power supply management chip to maintain voltage of the starting capacitor from the work circuit of the power supply management chip;
- wherein, in response to the voltage of the starting capacitor as detected by the voltage detector reaches a starting voltage of the power supply management chip, the power supply management chip controls the switching circuit to turn off.

* * * * *